Dec. 15, 1925.                                                   1,565,282
C. R. MABEE
PROCESS AND APPARATUS FOR TREATING VEGETABLE SUBSTANCES
Filed Aug. 16, 1920

Charles R. Mabee,
Inventor

By
Attorneys

Patented Dec. 15, 1925.

1,565,282

UNITED STATES PATENT OFFICE.

CHARLES R. MABEE, OF BUFFALO, NEW YORK, ASSIGNOR TO MABEE PATENTS CORPORATION, OF DELAWARE.

PROCESS AND APPARATUS FOR TREATING VEGETABLE SUBSTANCES.

Application filed August 16, 1920. Serial No. 403,861.

*To all whom it may concern:*

Be it known that I, CHARLES R. MABEE, a citizen of the United States, residing at the city of Buffalo, in the county of Erie and State of New York, have invented certain new and useful Improvements in Processes and Apparatus for Treating Vegetable Substances, of which the following is a specification.

This invention relates to heat and humidity regulating apparatus and the processes carried out thereby, which involve heating, cooking, mixing, intermittently compressing, breaking up and drying of vegetable substances, while subjecting them to constant movement through the center of a cylindrical container and constant movement in an opposite direction about the concave wall of the container, and while subjecting the materials treated to atmospheric pressure, and to increase and reduce pressure above and below that of the atmosphere. My invention has three objects in view, namely, 1. To extract soluble vegetable substances from insoluble vegetable substances, and dry the residue.

2. To render the fat, sugar and protein in vegetable substances substantially soluble in water without separating the fibrous and mineral matter therefrom.

3. To condense the nutrient or food value portions of vegetable substances by separating a portion or all of the insoluble or fibrous and mineral constituents from the soluble portions therein, and thereafter adding the soluble portions thereof to other vegetable substances of like or similar character, and cooking and drying the mass.

The invention is particularly applicable to the treatment of sugar cane, fodder, hay and vegetable crops to extract soluble substances therefrom by destroying elasticity and breaking down the fiber and cell structures, to concentrate food ingredients by separating fibrous and mineral matter therefrom, in the manufacture of foods for human and animal consumption, such as, concentrated extracts, dried extracts, soup stock and live stock feeds.

The drawings made a portion of this specification shows apparatus adapted to carry out my process but various changes may be made as to details whereby the same results may be accomplished without deviating from the invention.

In the accompanying drawings.

Figure 1:
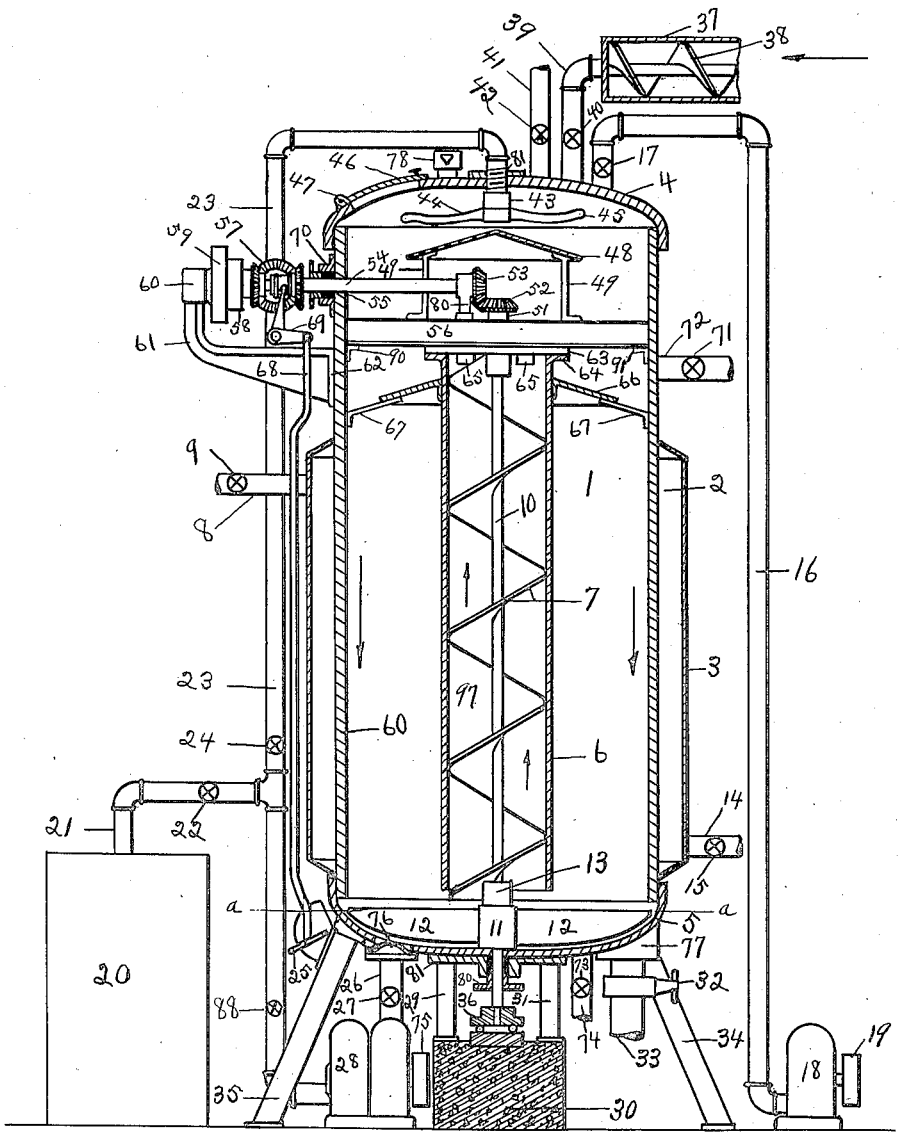
Fig. 1 is a cross section with parts conventionally shown.

Referring to the accompanying drawing, 1 is a cylindrical container closed at the upper end by the dished plate 4 and closed at its lower extremity by the dished plate 5. The wall of the container is shown at 60, surrounded at its central and lower portion by the jacket 2 the outer wall of which is designated at 3.

The jacket 2 is provided with a pipe connection shown at 8 with the regulating valve 9 therein, and with a condensation outlet pipe 14 provided with the regulating valve 15.

The container is supported by the legs shown at 34 and 35, and by the standards shown at 29 and 31.

The dished head 4 is provided with a manhole shown at 46 hinged thereto at 47, also with a safety valve shown at 78. The pipe connection shown at 23, attached at its lower extremity to the pump 28, passes centrally through the dished head 4 at 81, and at its lower extremity within the container adjacent to the dished head 4 is provided with the swivel joint 43 to which is attached the curved outlet pipes shown at 44 and 45.

The dished head 4 is also provided with the air vent pipe 41 in which is seated the regulating valve 42, also with the feed pipe 39 provided with the regulating valve 40. The feed pipe 39 is firmly attached to the conveyor cylinder 37 in which is seated the screw conveyor means shown at 38 to provide a uniform standard feed of vegetable materials into the container through the dished plate 4.

The dished head 4 is also provided with the suction pipe connection 16 in which is seated the regulating valve 17, the lower end of the suction pipe being connected with the vacuum pump shown at 18 provided with the pulley 19.

The dished head 5 is provided with the pipe connection shown at 26 in which is seated the regulating valve 27. The lower end of the pipe 26 is connected with the pump 28 provided with the pulley 75, and the upper end thereof is provided with the screen 76 to prevent solid substances within the container from passing therethrough into the pump 28.

The lower portion of the centrally disposed shaft 10 passes through the center of the dished plate 5 and is supported by the bearing 36 seated in the foundation shown at 30. At the point of its passage through the dished plate 5 the shaft 10 is provided with the stuffing box shown at 80, held in position by the casting plate shown at 81 to which the standards 29 and 31 are attached.

The dished plate 5 is also provided with the pipe connection 74 in which is seated the valve 73, and which provides means for the introduction of a heating and humidifying medium such as steam or heated water. The casting 77 is attached to the dished plate 5, and provided with a suitable opening therein for the passage of the pipe connection 33 in which is seated the regulating valve 32. The pipe connection 33 extends through the dished head 5 and provides means for the removal of materials from the container.

Figure 2:
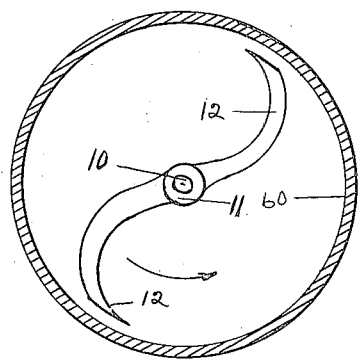
Fig. 2 is a cross section on the line *a—a*.

The lower portion of the central shaft 10, just inside of the container is provided with the casting shown at 11 to which the curved arms 12 are attached, as set out in cross section in Fig. 2. These curved arms are adapted upon rotation to feed the materials introduced into the container into the center of the lower portion thereof.

The central shaft 10, at its upper extremity, is supported and held in position by the casting 51 which is seated in the cross support shown at 56 passing through the upper portion of the container and attached to its walls by the braces shown at 90 and 91. The upper end of the shaft 10 is provided with the gear wheel 52, connected for transmission with the gear wheel 53 attached to the inner end of the shaft 54 which passes through the wall of the container at 55 being provided with the stuffing box shown at 70. The shaft 54 is supported by the bearing shown at 80 supported by the cross support 56, at its inner extremity, and at its outer extremity by the bearing 60 supported by the brace 61 attached to the wall of the container at 62. Mounted upon the shaft 54, outside of the container, are the pulleys 58 and 59. The shaft 54 is provided with the reversible gear shown at 57 for changing the rotary motion thereof, by means of the gear lever 69, connected with the gear rod 68 to which is attached the gear handle 25.

The braces shown at 49 attached to the upper surface of the cross support 56 form a foundation for the directing plate 48 to prevent materials passing through the dished plate 4 from coming in contact with the gear wheels 52 and 53.

The inner container 97 is flanged at 64 and attached to the plate 63 firmly fixed to the lower surface of the cross support 56, and at its upper extremity is provided with restricted orifices shown at 65.

Mounted on the central shaft 10 is the screw conveyor shown at 7, and attached to the upper convex surface of the inner container is the directing collar 66 which extends completely around the inner container and is braced to the concave surface of the cylindrical container by the arms 67.

The wall 60 of the container 1 is provided with the pipe connection 72 in which is seated the regulating valve 71, providing means for the introduction of liquid substances into the container.

The pipe connection 23 is provided with the connecting pipe 21 in which is seated the valve 22, adapted for the deposit of liquid substances from the container 1 into the receiving tank 20.

In practicing my invention to accomplish the first object of my invention, namely, to extract soluble vegetable substances from insoluble vegetable substances, the vegetable materials are introduced into the container 1 by the screw conveyor 38 attached to the conveyor pipe 39, the valve 40 being open, and when the container is filled the valve 40 is closed. While filling the container the internal moving parts consisting of the curved arms 12 and the screw conveyor 7, are set in motion to equally distribute the materials. The valve 73 in pipe 74 is open to introduce steam into the container and at the same time the valve 42 is open in the air and vapor escape pipe 41 to enable the steam entering one end of the container to drive out the air from the opposite end, as the presence of air serves to inhibit the proper application of heat to the materials.

Where the materials treated are excessively dry and fibrous I admit a small amount of water with the steam, and after closing all outlets from the container, steam is admitted to the jacket by the opening of the valve 9 in the inlet pipe 8, at which time the valve 15 in the condensation outlet pipe 14 is adjusted to permit the exit of condensed steam.

During the cooking period of treatment power is applied to the shaft 54 by the pulley 59, and the connecting shaft 10 is rotated about twenty times per minute. The curved arms 12 draw the materials from the lower and outer surfaces of the container toward the center where they are caught up by the lower portion of the screw conveyor 7 and lifted upward through the inner container 97 against the plate 63 and there is as a result a material pressure set up in the container 97 which intermittently compresses the materials and breaks up their fibrous and cellular structure which breaking up enables the heat and humidity from the steam to separate the soluble portions of the vegetable materials from the insoluble portion, the soluble portions entering into solution with the condensation from the steam. The materials escape from the inner container 97 through the orifices 65 which at regular intervals surround the wall 6 of the inner container, and which constitute a series of restricted outlet orifices through which the vegetable materials continually flow and are deposited on the directing plate 66 which completely surrounds the outer wall of the inner container 97. The constant outflow of the materials through the restricted orifices shown at 65 forces the materials deposited upon the directing plate 66 to be deposited adjacent to the concave surface of the cylindrical container 1, as shown at 60, and by the manner described the materials constantly rotate endwise through the center of the container and endwise through the outer zone within the container between the wall 6 of the inner container and the wall 60 of the cylindrical container, which constant rotating movement combined with the intermittent application of pressure while passing through the inner container and out thereof through the restricted orifices, equalizes the application of humidity to the materials during treatment as well as uniformly treats the materials as to the breaking up of fibrous and cellular structures.

Where vegetable materials such as fodder and hay are ground or shredded, the operation is slow and material power is required for the operation, and I have found that by the use of a screw conveyor within an inner cylinder, as described in this invention, that the stalks of corn and sweet clover, for instance, may be cut at lengths approximating one inch, and by the compression within the inner cylinder 97 and their forced passage through the series of restricted orifices, commercial results are secured which saves material labor and costs in operation, and this I consider as an important feature of the invention.

During the period of cooking treatment I have found it advantageous to circulate vegetable juices through the container endwise, and I open the valve 27 in the pipe 26 leading from the dished plate 5 to the pump 28, and by applying power through the pulley 75 I constantly pump the vegetable juices out from the lower end of the container through the pipe 23, and the swivel joint 43 into the curved pipes 44 and 45, which rotate at a rapid rate, and the ends being open the liquid juices pass out therefrom and are deposited upon the concave surface of the cylindrical container as shown at 60 in layer formation, and descend over the heated surfaces while the central space within the circular layer of liquid material deposited upon the concave heated surface is filled with the materials to be treated by steaming from the steam generated within the circular layer of liquid materials, and this I claim as an important feature of the invention. I maintain within the cylindrical container a steam pressure ranging from 7 to 90 pounds, according to the materials treated.

The constant circulation of the vegetable materials within the container, and the constant circulation of liquid materials through the container, intensifies the humidity, breaks up the fibrous and cellular structures, and quickly produces a cooked product uniform in character. The fibrous materials are prevented from passing into the pipe 26 by the screen plate 76 which guards its inlet orifice, and also prevents the swivel and curved pipes 44 and 45 from becoming clogged with fibrous materials.

When the vegetable materials have been broken up in structure and the soluble portions thereof have entered into solution, the valve 24 in the pipe 23 is closed and the vegetable juices are deposited in the tank 20, by the opening of the valve 22 in the connecting pipe 21. When the juices have been exhausted from the container 1, the valve 22 is closed and the valve 24 is opened, and additional water is introduced into the container through the pipe 72 and the opening therein of the valve 71, after which valve 71 is closed, and the water thus introduced is employed to wash the fiber of remaining soluble materials which enter into solution, and in turn are deposited in like manner to the juices in the tank 20.

The pump 28 is then stopped, the valve 27 in pipe 26 is closed, the valve 42 in pipe 41 is opened, and the steam is permitted to escape from the container. The internal moving parts are continued in operation the moist materials passing continuously down over the heated surfaces and the vapor of evaporation therefrom is permitted to continuously escape through the pipe 41 from the container until a portion of the moisture content has been removed, after which the valve 42 in pipe 41 is closed and the valve 17 in pipe 16 is opened after which power is applied by the pulley 19 to the vacuum or suction pipe 18 and a commercial vacuum is maintained within the container. The presence of this partial vacuum combined with the constant circulation of the vegetable materials within the container, maintaining standard conditions as to moisture content throughout the entire mass, soon effects a complete drying of the residue of fibrous materials.

When the materials are dried the vacuum pump is stopped and the valve 42 in pipe 41 is opened to admit air and subject the container to normal pressure, after which the valve 32 in the outlet pipe 33 is opened and the lever 25 connected with the rod 68 is adjusted to reverse the movement of the curved arms 12 and the screw conveyor 7, and the materials are forcibly ejected from the container by being removed from the inner cylinder by the screw conveyor and from the outer zone of the cylindrical container by the action of the curved arms 12 which are so inclined to force the materials toward the outer internal portion of the container.

To accomplish the second object of my invention, namely, to render the fat, sugar and protein in vegetable substances substantially soluble in water without separating the fibrous and mineral matter therefrom, the operation is the same as in the first instance, just recited, except that the juices are not deposited in the tank 20 and the vegetable materials are not washed with water to remove remaining soluble portions, but in accomplishing this object after the materials are thoroughly cooked, vapor of evaporation is permitted to escape through the pipe 41 until the materials are partially dried, after which a commercial vacuum is maintained to effect final drying after which the materials are removed from the container in the manner described in connection with the accomplishing of the first object of my invention.

In accomplishing the third object of my invention, namely, to condense the nutrient or food value portions of vegetable substances by separating a portion or all of the insoluble or fibrous and mineral matter from the soluble portions and thereafter adding the soluble portions thereof to other like substances, and cooking and drying the mass, vegetable substances are introduced into the container as described under the first object of this invention, and the juices from the tank 20 are introduced into the container during the period when a partial vacuum is maintained within the container, by closing the valve 88 in pipe 23, opening the valve 24 in pipe 23 and the valve 22 in pipe 21, which extends to the lower portion of the tank 20, the vacuum suction being employed to introduce the vegetable juices into the container 1, after which by the constant circulation of the vegetable substances within the container, the juices are thoroughly mixed and dried with the cooked vegetable substances therein. In other cases, I have introduced the vegetable juices through the pipe 72 by opening the valve 71, and in these cases I allow the vapor of evaporation to escape through the pipe 41 by opening the valve 42 until a material portion of the moisture content has been removed by evaporation, after which I close valve 42, open valve 17 and start the vacuum pump 18 to effect final drying. I do not limit the invention to the drying of the substances under partial vacuum, as I have found that good results may be secured in final drying by the continued circulation of the materials and the continued escape of the vapor of evaporation as described through the outlet pipe 41. In this third instance, the dried materials are removed from the container as in the first object of my invention as described, where the residue or fiber is removed.

What I claim is:

1. An apparatus for treating vegetable materials, comprising a closed cylindrical container, a spiral conveyor supported centrally therein, positive feeding means for introducing said vegetable materials in said container, and means for spraying liquid materials into the container and upon the vegetable materials.

2. An apparatus for treating vegetable materials, comprising a closed cylindrical container, a spiral conveyor supported centrally therein, positive feeding means for introducing said vegetable materials in said container, means for spraying liquid materials into the container and upon the vegetable materials, and curved members located immediately beneath the spiral conveyor and adapted to carry said vegetable materials to said spiral conveyor.

3. An apparatus for treating vegetable materials, comprising a closed cylindrical container, a spiral conveyor supported centrally therein, positive feeding means for introducing said vegetable materials in said container, means for spraying liquid materials into the container and upon the vegetable materials, and means for withdrawing liquid materials from the base of the container and returning the same thereto at its top.

4. An apparatus for treating vegetable materials, comprising a closed cylindrical container, a spiral conveyor supported centrally therein, positive feeding means for introducing said vegetable materials in said container, means for spraying liquid materials into the container and upon the vegetable materials, curved members located immediately beneath the spiral conveyor and adapted to carry said vegetable materials to said spiral conveyor, and means for withdrawing liquid materials from the base of the container and returning the same thereto at its top.

5. An apparatus for treating vegetable materials, comprising a closed cylindrical container, a spiral conveyor supported centrally therein, positive feeding means for introducing said vegetable materials in said container, means for spraying liquid materials into the container and upon the vegetable materials, and means located above said spiral conveyor adapted to deflect the vegetable materials toward the outer wall of the container.

6. A method for the treatment of vegetable materials, which comprises subjecting said materials in a moistened condition to an alternate compression and expansion at an elevated temperature and at a pressure above atmospheric, whereby the starch granules and fiber structures are broken down, rendered more thoroughly assimilable, and a portion thereof converted into sugars.

7. A method for the treatment of vegetable materials, which comprises subjecting said materials in a closed container in a moistened condition to alternate compression and expansion at an elevated temperature and at a pressure of from 7 to 90 pounds, whereby the starch granules and fiber structures are broken down, rendered more thoroughly assimilable, and a portion thereof converted into sugars.

8. A method for the treatment of vegetable materials, which comprises introducing said materials into a closed container and subjecting the same therein under the influence of steam at a pressure of from 7 to 90 pounds to alternate compression and expansion, whereby the starch granules and fiber structures are broken down, rendered more thoroughly assimilable, and a portion thereof converted into sugars.

CHARLES R. MABEE.